Figures 1, 5, 6:
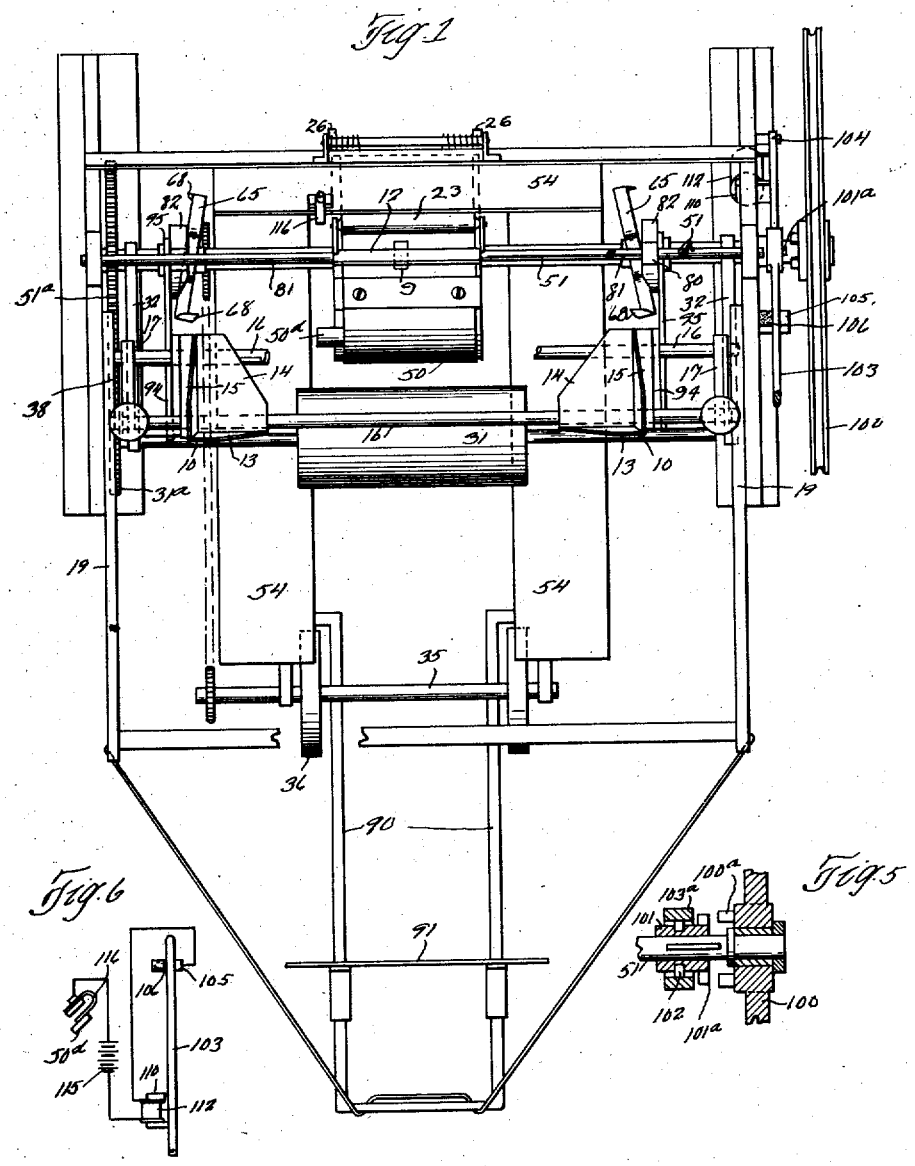

C. CHISHOLM.

ENVELOPE FEEDING MECHANISM.

APPLICATION FILED FEB. 4, 1920.

Reissued July 25, 1922. 15,419.

2 SHEETS—SHEET 1.

Inventor

Clifton Chisholm,

By Baker & Macklin,

Attys.

C. CHISHOLM.

ENVELOPE FEEDING MECHANISM.

APPLICATION FILED FEB. 4, 1920.

Reissued July 25, 1922. 15,419.

2 SHEETS—SHEET 2.

Inventor

Clifton Chisholm

By Baker & Macklin,

Attys.

UNITED STATES PATENT OFFICE.

CLIFTON CHISHOLM, OF CLEVELAND, OHIO, ASSIGNOR, BY MESNE ASSIGNMENTS, TO THE AMERICAN MULTIGRAPH COMPANY, OF CLEVELAND, OHIO, A CORPORATION OF OHIO.

ENVELOPE-FEEDING MECHANISM.

15,419. Specification of Reissued Letters Patent. Reissued July 25, 1922.

Original No. 1,285,623, dated November 26, 1918, Serial No. 202,094, filed November 15, 1917. Application for reissue filed February 4, 1920. Serial No. 356,279.

*To all whom it may concern:*

Be it known that I, CLIFTON CHISHOLM, a citizen of the United States, residing at Cleveland, in the county of Cuyahoga and State of Ohio, have invented a certain new and useful Improvement in Envelope-Feeding Mechanism, of which the following is a full, clear, and exact description.

This invention relates to means for automatically feeding unsealed envelopes from a supply thereof. The invention may be utilized in conjunction with any suitable machine to act on the fed envelopes. As an illustration of such supplemental machine, I may cite an address printing machine, in which address plates are automatically brought into printing relation with envelopes which the mechanism of the present invention automatically withdraws from a supply and carries into presentation to the plates.

The general object of the invention is to provide efficient mechanism for the purpose desired, which will rapidly and certainly withdraw the envelopes one at a time and carry them through the machine as stated.

Another object is to render this mechanism adjustable to such an extent as is necessary to enable its use in connection with envelopes of various sizes.

Another object of the invention is to provide such envelope feeding mechanism as will withdraw from the envelope supply only such envelopes as are so placed therein that when withdrawn they will be properly presented to the address plates. When envelope feeding mechanism is employed which acts regardless of whether the envelopes are placed in the envelope magazine in one way or another, envelopes which are misplaced therein will frequently be spoiled by having the addresses printed thereon at the wrong place or direction before the operator notices that the envelopes have been misplaced.

The invention comprises the combination of cooperating mechanisms for accomplishing the above results, or some of them, without regard to the specific character of the individual mechanisms employed, it includes also the embodiment shown in the drawings and hereinafter described.

Figures 2, 3, 4:
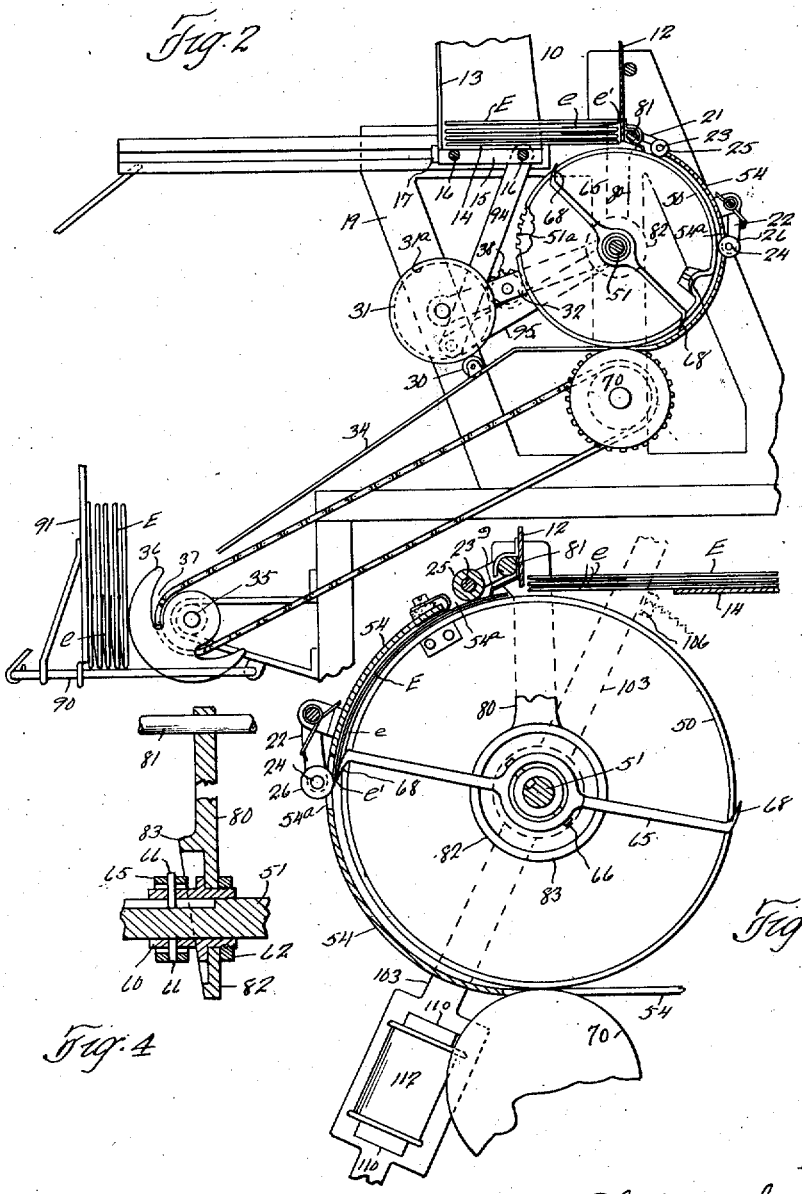

In the drawing, Fig. 1 is a plan view of mechanisms in which the present invention is embodied; Fig. 2 is a side elevation partly sectioned, from the right side of Fig. 1; Fig. 3 is an enlarged side elevation from the left side of Fig. 1 of a part of said mechanism; Fig. 4 is a vertical sectional view showing one of the face cams for operating one of the fingers which engage the envelope flap; Fig. 5 is a sectional view of the clutch mechanism for connecting or disconnecting the driving pulley; Fig. 6 is a diagram of an electro-magnetic stop device which may be associated with my feeding mechanism.

A stack of envelopes to be addressed is placed in a suitable magazine or holder, which as a whole is indicated by 10. This magazine, as shown, includes a fixed vertical plate 12 which is located at a point adjacent but preferably slightly in front of the highest part of the cylindrical platen 50—there being between the surface of the platen and the lower edge of plate 12 a narrow slot 11 through which the envelope may pass. The magazine also includes two rear corner members 13, preferably made of thin metal bent to form angle bars as shown. Each corner member carries a horizontal plate 14, which plates serve as the bottom of the magazine.

The supporting plates 14 must be large enough to support the stack of envelopes, but they preferably should be of such shape that neither of them lies under the flap *e* of the lowest envelope E of a stack when the envelopes are placed in the magazine with their flaps downward and pointing rearward, that is to say, with a bend *e'* that connects the envelope and flap adjacent the front plate 12 of the magazine. The two corner members 13 are respectively secured to slides 15 which are movably mounted on transverse bars 16 rigidly secured to end pieces 17 to form a sliding frame. This frame is slidable horizontally on the main frame 19 of the machine toward and from the front plate 12.

It will be seen that the envelope magazine described is adapted for longer or shorter envelopes by moving the slides 15 away from or toward each other. It is likewise possible to adapt the magazine for wider or narrower envelopes by moving the sliding frame 16, 17, away from or toward the fixed front plate.

A comparatively short cylindrical platen 50 is secured to a rotatable shaft 51 mounted in fixed bearings in the frame work of the machine, this platen being located in the stated relation to the envelope magazine. This shaft is preferably the main driving shaft of a machine of which the described envelope handling mechanism is a part.

The shaft 51 passes loosely through and may help to support two non-rotating face cams 82 which are located at opposite ends of said platen. Each of these face cams is carried by a hanger 80 which is partly supported by, but is movable transversely with respect to an extended frame bar 81 so as to carry these cams toward or away from the ends of the platen.

Associated with each cam is a sleeve 60 which has a tongue and groove driving connection with the shaft 51. It may, therefore, move lengthwise on that shaft, but must rotate with it. The associated cam projects into an annular groove in the associated sleeve, the groove being between the annular shoulder 61 on the sleeve and a nut 62 which screws onto said sleeve. The sleeve may, therefore, rotate in the cam; but when either is moved lengthwise of the shaft the other must move with it.

An envelope feeding lever 65 straddles each of the sleeves 60 and is pivoted thereon by pivot pins 66 which are diametrical with respect to the shaft and sleeve. As a measure of economy in construction one of these pins passes through the sleeve into a longitudinal groove 57 in the shaft and thereby the tongue and groove connection between the shaft and sleeve is produced. Each feed lever 65 engages the cam flange 83 on both sides of the axis of the shaft; wherefore, as the shaft turns the cams will cause these levers to rock on their pivots.

Each lever has at the outer end of each of its arms a thin offset finger 68. The lever arms are of such length that as the shaft is rotated, the fingers will, as they move across the top of their paths, engage the lower face of the lowest envelope, and will insert themselves between the lower surface of that envelope and the depending flap thereof, and come against the bend *e'* which unites the flap and envelope. It should be explained that the cams 82 are of such shape, substantially as shown, that as the fingers are ascending toward the envelopes, their respective fingers are moved toward each other, and, therefore, into such position that the fingers will pass between the under face of the lowest envelope and its flap and engage the bend, as stated.

As the shaft 51 continues to turn the flap-engaged lowest envelope will be positively withdrawn from the magazine below the lower edge of the front plate 12 and will be carried around with the platen cylinder, as shown in Fig. 3. The envelope will be caused to curve around this platen cylinder by a curved shield 54, which is fixed in position and follows the curvature of the platen cylinder from the front plate 12 nearly down to the bottom of the cylinder, which is the point at which the envelopes will be brought into printing engagement with printing plates which are being fed through the machine between the platen 50 and a cooperating platen 70, by any suitable mechanism. An illustration of a suitable plate-feeding mechanism may be found in my Patent No. 1,285,622, issued November 26, 1918.

Before the envelope reaches the printing position the cams 82 will have swung the feed levers 65 on their pivots so as to move their fingers apart, and thus cause them to release their engagement with the envelope. This outward movement of the descending arms of the feed levers is obviously accompanied by a movement toward each other of the ascending arms of these levers to bring them to the described position where their fingers will engage the lowest envelope then in the magazine. This, of course, assumes that fingers are placed on both ends of these envelope feeding levers. When they are so placed as shown, two envelopes are withdrawn from the magazine during each revolution of shaft 51. If the fingers are placed only at one end of each lever only one envelope would be withdrawn from the magazine during each revolution of the shaft 51.

Two spring actuated frames are pivoted to the outer face of the curved guard plate 54. These respectively carry the rotatable shafts 23, 24, and on these shafts are fixed rollers 25, 26, which extend through slots 54ª in the curved guard plate and press the envelopes against the rotatable platen. Therefore, the envelope will be caused to closely hub the platen and will travel with it after it has been released from the fingers.

It is obviously desirable that only one envelope shall pass at a time out of the magazine under the front plate thereof. To insure against a fed envelope dragging another with it by friction, I provide one (or more) stop fingers 9, best shown in Fig. 3, which are located a short distance in front of the front plate and extend downward toward the platen cylinder. The lower edge of this finger is below the horizontal plane in which next to the lowest envelope lies in the magazine. Therefore, when the feed fingers 68 engage the lowest envelope and positively begin to withdraw it beneath the lower edge of the front plate, the next envelope, if it should be dragged by the lowest envelope and pass with it below the front plate, will come against the stop finger and any further movement forward will be prevented. However, before the front edge of the lowest envelope reaches the stop finger, the front edge of this lowest envelope will have been bent downward so that it will pass beneath the stop finger. When the next pair of feed fingers 68 come up they will pass above the flap of the envelope which was next to the lowest and was moved forward this short distance, and by engagment with its flap, will pull the front edge of this envelope down below the stop finger and will carry the envelope under it as above specified.

As the addressed envelopes pass out from under the platen cylinder 50 they are pushed between two feed rolls 30, 31, from which they are discharged onto downwardly inclined bars 34 upon which they slide down toward the horizontal stacking bars 90. A stacking device catches the envelopes as they slide down these bars 34 and delivers them onto the stacking bars 90 and pushes them against a follower 91 which slides upon the stacking bars.

The stacking device as shown comprises a shaft 35, which rotates in proper relation to the other rotating parts of the machine, and carries two cam disks 36 each of which has an envelope receiving peripheral slot 37 of ample capacity. Each envelope slides down the inclined bars 34 and passes edgewise into the two slots, which, by the rotation of the shaft 35, have reached the position to receive the envelope. The continued revolution of said slotted disks deposits the envelope edge downward onto the stacking bars 90, and then the periphery of the disks engage the envelope and push it along the stacking bars and holds it upright until the instant before another envelope is similarly delivered onto the stacking bars.

The feed roll 30 is rotatably mounted on a fixed axis. The feed roll 31 is mounted on a frame 32 which is hung on the shaft 51. The roll 31 carries a gear $31^a$ that meshes with an idler gear 38 mounted on frame 32, and this idler gear in turn meshes with and is driven by a gear $51^a$ fixed to shaft 51.

Each of the magazine corner members has pivoted to it the upper end of a link 94 which is pivoted at its lower end to another link 95, which in turn is pivoted to the hanger 80 which supports the associated cam. This connection between the magazine members and cam need not be of such character that if a magazine member is moved transversely the associated cam is thereby moved, but as shown, is so arranged that it practically prevents the operator from moving a magazine member laterally unless at the same time he does move the associated cam back to its hanger. It is of course essential that if the magazine members are properly adjusted for an envelope of the given size the cams and associated envelope feeding levers must be correspondingly adjusted. The toggle links referred to serve to remind the operator of this necessity and to show him when he has positioned the hopper member and cam properly with respect to one another.

The power to drive the machine may be applied through a pulley under the control of a clutch. Thus, I have shown a pulley 100 which is loosely mounted on shaft 51, and adjacent this pulley is a sliding clutch sleeve 101 (see Fig. 5) having a tongue and groove connection with the shaft 51. This carries jaws $101^a$ adapted to engage or disengage jaws $100^a$ on the hub of the pulley 100 to thereby make or break the driving connection between the pulley and the shaft. This sleeve has a circumferential groove, and into this groove project pins 102 carried by a yoke $103^a$ which is a part of a shifting lever 103 pivoted to a bracket 104 fixed to the machine frame. By operating this lever this clutch sleeve may be moved into engagement with the pulley, or out of engagement with it.

If desired, a suitable stop mechanism may be provided to stop the machine in case an envelope fails to be fed. I have shown for this purpose mechanism illustrated in Figs. 3 and 6, which will now be described. The shift lever 103 is adjacent the poles 110 of an electro-magnet 112 which is fixed to the frame work of the machine, and the lever serves as the armature of that magnet. When the magnet is energized and therefore attracts the lever, the lever will swing in the direction to cause it to withdraw the clutch sleeve from its engagement with the pulley. Therefore, to disconnect the machine from the source of power it is only necessary to energize this magnet.

The circuit of the magnet 112, as shown diagrammatically in Fig. 6, includes a suitable source of current 115 connected with one terminal of the magnet winding. The other terminal of the magnet may be connected to the metallic frame work of the machine. The source of current may be connected with an insulated switch spring 116 supported by the frame work of the machine in a position such that a metallic contact plate $50^d$ which is fixed to the rotating platen may under certain circumstances engage with it. This contact plate is, however, fixed to the platen in a position such that when the feed fingers have taken hold of an envelope they will drag that envelope between the spring 116 and this contact plate 50[d] and thereby prevent the two from coming into electrical contact. So long, therefore, as envelopes are being drawn from the magazine by the feed arms, electrical contact between the switch and contact plate will be prevented. But if the envelopes have all been withdrawn from the magazine, or if the bottom envelope has been misplaced so that its flap does not lie in the described relation to the front plate of the magazine and the platen cylinder and feed arms, the feed arms will not withdraw an envelope from the hopper, and therefore, the contact plate and spring described will come into electrical contact. This will complete the circuit of the magnet, with the result that the clutch operating lever will be moved in the direction which will disengage the clutch sleeve from the pulley, and thereupon, the machine, being disconnected from the source of power, will stop.

The clutch shifting lever 103 is a part of the circuit of the magnet, being normally in contact with an insulated metal plate 105 which is a terminal of a circuit wire, the lever itself is connected with the metallic part of the machine frame. When the circuit is completed by the engagement of the contact plate on the platen with the switch spring referred to, and the magnet is energized, and the lever 103 moved so as to disconnect the machine from the driving pulley, this movement of the lever moves it out of contact with metallic plate 105 and against an insulating stop block 106, whereby the circuit of the magnet is broken in another place. Therefore the circuit will be effectively interrupted even though the platen stops with the contact plate thereon still in contact with the switch spring.

It will be seen from the above description that my machine, while simple in construction, has advantages of being adjustable for various sizes of envelopes; of feeding such envelopes very rapidly from the supply thereof; of controlling the withdrawal so that only one envelope is withdrawn, and of feeding only such envelopes as are properly placed in the magazine. I have referred to the use of the feeding mechanism in conjunction with address-printing machines, but it is to be understood that the present invention is independent of the mechanism which acts on the fed envelopes and may be advantageously employed where the subsequent treatment of the envelope is other than printing an address thereon.

I claim:

1. In an envelope feeding device, the combination of pivoted means adapted to swing toward the ends of an envelope to engage the envelope between its flap and the adjacent face, means for moving said engaging means into and out of engaging position, and means for moving said engaging means in another direction to feed the envelope engaged.

2. In an envelope feeding device, the combination with a stack of envelopes of means adapted to engage the endmost envelope between its flap and the adjacent face, means for moving said engaging means from a position beyond the end of the envelope into engaging position, and means for moving said engaging means transversely of the stack to feed the envelope engaged.

3. In an envelope feeding device, the combination of a pair of pivoted members adapted to engage the envelope between its flap and the adjacent face, means for moving each member from a position beyond the end of the envelope into engaging position, and means for moving the pair of members as a unit to feed the envelope engaged.

4. In an envelope feeding mechanism, including a bottom feed hopper the combination of mechanism adapted to engage the bottom envelope between its flap and its adjacent face, means for moving said mechanism from a position beyond the end of the envelope into engaging position, and means for giving it a rotary movement while engaged to feed the envelope.

5. In an envelope feeding mechanism, including a bottom feed hopper the combination of mechanism adapted to engage the bottom envelope between its flap and its adjacent face, means for giving it a rotary movement while engaged to feed the envelope, and means for giving it another movement toward the ends of the envelope while rotating to cause it to engage the envelope.

6. In an envelope feeding mechanism, including a gravity feed hopper the combination of a member adapted to engage the bottom envelope between its flap and its adjacent face, means for moving said member from beyond the end of the envelope into engaging position, and means for revolving said member while engaged to feed the envelope along a circular path.

7. In an envelope feeding mechanism, a hopper for maintaining the envelopes in a superimposed stack the combination of a pair of fingers, means for moving them relative to each other to engage the bottom envelope between its flap and its adjacent face, means for causing the fingers to travel with the engaged envelope, and means for thereafter withdrawing the fingers from the envelope.

8. In an envelope feeding mechanism, the combination of a pair of fingers, means for swinging them about individual axes to engage the envelope between its flap and its adjacent face, means for causing the engaged fingers to travel as a unit to feed the engaged envelope, and means for thereafter withdrawing the fingers from the envelope.

9. In an envelope feeding mechanism, the combination of a pair of pivoted fingers, means for moving them toward each other to engage an interposed envelope between its flap and its adjacent face, means for causing the fingers to rotate together about a common axis to feed the engaged envelope, and means for thereafter moving the fingers apart to free the envelope.

10. The combination, with a rotary platen, of members pivoted on an axis arranged at an angle to the axis of the platen and adapted to engage an envelope between its flap and adjacent face to feed the envelope with the platen.

11. The combination with a rotary platen of members pivoted on an axis arranged at an angle to the axis of the platen and adapted to engage an envelope between its flap and adjacent face to feed the envelope with the platen, and mechanism for giving said means another movement to engage the envelope.

12. The combination with a rotary platen of a pair of pivoted members rotating therewith and located at opposite ends thereof, and means for moving said members toward the ends of the platen during their said rotation to cause them to engage the envelope between its flap and adjacent face to feed the envelope with the platen.

13. The combination, with a rotary platen, of rotary means adapted to engage an envelope between its flap and adjacent face to feed the envelope with the platen, and means for swinging said rotary means about an axis arranged at an angle to that of its feeding rotation, whereby it may engage the envelope.

14. The combination of a rotary platen, a printing platen and a pair of envelope feeding fingers at the opposite ends of the platen, means for moving said fingers toward and from each other to engage and clear the envelope between its flap and adjacent face, and means for rotating the fingers with the platen during the time they are in engagement with the envelope.

15. The combination of a rotary platen, a rotary shaft on which it is mounted, a device, including members movable relative to each other movably mounted on said shaft but rotating therewith and adapted to engage an envelope between its flap and adjacent face to feed the envelope with the platen, and mechanism for moving said device relative to the shaft to cause it to engage the envelope.

16. The combination of a rotary shaft, a rotary platen thereon, a printing platen cooperating therewith, a pair of envelope-feeding fingers movably mounted on the shaft at the opposite ends of the platen, means for moving said fingers relatively to the shaft and toward and from each other to engage and clear the envelope between its flap and adjacent face, and means whereby the shaft rotates the fingers and platen together during the time the fingers are in engagement with the envelope.

17. The combination of a rotary shaft, a platen thereon, a second platen cooperating therewith, a pair of envelope-feeding fingers at opposite ends of the first platen, carried by said shaft and adapted to rotate with it, and means for moving said fingers toward and from each other during their rotation about the axis of the platen.

18. The combination of a rotary platen, a rotating shaft on which it is moved, a pair of envelope-feeding fingers on the shaft and located at opposite ends of the platen respectively, means for moving said fingers relative to the shaft toward each other to engage the envelope between its flap and adjacent face, means whereby the shaft may rotate the engaged fingers as a unit with the platen to feed the envelope, means for moving the fingers apart to withdraw them from the envelope, all of said movements of the fingers taking place while the shaft is rotating and a second platen coacting with said first platen.

19. The combination with a rotary platen of a pair of envelope-feeding fingers adapted to travel concentrically with the platen and means for giving said fingers another movement relative to each other to cause them to move toward the end of the envelope to engage the same and a second platen coacting with the platen first mentioned.

20. The combination with a rotary platen of a pair of envelope-feeding fingers adapted to travel concentrically with the platen, and means for giving said fingers relative movement about other axes to cause them to move toward the end of the envelope to engage the same and a second platen coacting with the platen first mentioned.

21. The combination, with an envelope magazine adapted to feed envelopes from the bottom thereof, of an adjacent rotary platen, a pair of envelope-feeding fingers at opposite ends of the platen, mechanism for continuously rotating the platen and continuously rotating the fingers about the same axis, and mechanism for causing said fingers to approach each other and recede from each other during the said rotation, whereby they may engage the bottom envelope between its flap and adjacent face and then draw said envelope along with them in a curved path and thereafter clear the envelope.

22. The combination of a rotatable platen shaft, a platen fixed thereto, an envelop magazine adjacent said platen, two feed arms which are respectively located at opposite ends of said platen and mounted on said shaft and project at substantial right angles to said shaft, each of said arms having at its end a feed finger, and means for swinging said feed fingers toward the ends of the envelope as the shaft rotates.

23. The combination of a rotatable platen shaft, a platen fixed thereto, an envelop magazine adjacent said platen, two feed arms each of which is pivoted to said shaft on an axis substantially at right angles to the shaft and each of said levers having at its end a feed finger, and means for rocking said feed levers on their pivots as the shaft rotates.

24. The combination, with a rotary platen, of rotary means adapted to move toward the ends of an envelope to engage the same between its flap and adjacent face to feed the envelope with the platen, and a fixed cam adapted to act on said rotary means to cause it to engage the envelope.

25. The combination with a rotary platen, of a pair of pivoted individually movable envelope-feeding fingers adapted to travel concentrically with the platen, a pair of cams for giving said fingers movement longitudinally of the platen to cause them to move into engagement with the envelope, and means for rotating the fingers and platen together.

26. The combination of a pair of rotary shafts, platens thereon, a pair of envelope-feeding fingers at opposite ends of one platen, carried by one shaft and adapted to rotate with it, and a pair of fixed cams moving said fingers toward and from each other during their rotation about the axis of the last mentioned platen.

27. The combination of a rotatable platen shaft, a platen thereon, two feed arms which are respectively located at opposite ends of said platen and are pivoted to said shaft on axes which are at substantial right angles to said shaft,—each of said arms having a feed finger, and a fixed cam which is associated with and engages each feed arm and causes it to rock on its pivot, substantially as specified, as said shaft rotates.

28. The combination of a feed magazine, a rotatable platen located below the same, a shaft to which said platen is secured, feed arms located at opposite ends of said platen and respectively pivoted to said shaft on axes which are substantially at right angles to the shaft each of said arms having at its end an offset feed finger, two cams which loosely embrace the said shaft adjacent said feed arms, means which prevent the rotation of said cams but permit their longitudinal movement upon said shaft, means to preserve the engagement of said cam, respectively with the adjacent feed arms.

29. The combination of a feed magazine comprising a fixed front plate and two rear corner members, a sliding frame on which said corner members are mounted which frame is movable toward and from the fixed plate and said corner members being movable on said frame toward and from each other and each of said corner members having at its lower end an envelop supporting bottom, a rotatable platen located below said magazine, and mechanism adapted to rotate with the platen and engage between the flap and adjacent face of the bottom envelope in the magazine.

30. The combination of a feed magazine, comprising a fixed front plate and two rear corner members, a sliding frame on which said corner members are mounted which frame is movable toward and from the fixed plate and said corner members being movable on said frame toward and from each other and each of said corner members having at its lower end an envelop supporting bottom, a rotatable platen located below said magazine, a shaft to which said platen is secured, two cams which loosely embrace the said shaft, envelope feeding devices operated by said cams, means which prevent the rotation of said cams but permit their longitudinal movement upon said shaft, means to preserve the engagement of said cams respectively with the adjacent envelope feeding device, and connections between said cams respectively and the two corner members of the magazine to require that when a cam is moved longitudinally with respect to the shaft the corresponding corner member shall be similarly moved.

31. The combination of a feed magazine comprising a fixed front plate and two rear corner members, a sliding frame on which said corner members are mounted which frame is movable toward and from the fixed plate and said corner members being movable on said frame toward and from each other and each of said corner plates having at its lower end an envelop supporting bottom, a rotatable platen located below said hopper, a shaft to which said platen is secured, feeding mechanism located at opposite ends of said platen and comprising feeding fingers and two cams which loosely embrace the said shaft, means which prevent the rotation of said cams but permit their longitudinal movement upon said shaft, means to preserve the engagement of said cams respectively with the adjacent feeding members, and toggles which connect the two magazine corner members with the two cams respectively.

32. In an address printing machine, the combination of an envelop magazine, the bottom of which does not extend beneath the flaps of the envelops supported thereon, an adjacently placed rotatable platen, a rotatable shaft to which said platen is secured, envelop feeding arms, each of which is carried by said shaft and extends in opposite directions therefrom, each of said arms having at each of its ends a finger which extends toward the platen, and non-rotatable cams which surround said shaft, there being provision for enabling the cams to rock pivoted arms and rock them on their pivots.

33. In an address printing machine, the combination of an envelop magazine whose bottom does not extend beneath the flaps of the envelops supported thereon, an adjacently placed rotatable platen, a rotatable shaft to which said platen is secured, sleeves having tongue and groove connections with said shaft and lying adjacent opposite ends of said platen, envelop feeding devices including arms, each of which extends on opposite sides of said shaft and is carried by one of said sleeves and has at each of its end an offset finger, non-rotatable cams which surround said shaft and adapted to cause the rocking of the feeding device into or out of feeding position and means for so connecting said sleeves and cams that any movement of a sleeve lengthwise of the shaft is accompanied by a corresponding movement of the associated cam.

34. In an address printing machine, the combination of a rotatable platen, a rotatable shaft to which said platen is secured, a transversely extended horizontal frame member, a pair of hangers slidably mounted upon said frame member, adjacent opposite ends of said platen, two envelop magazine members respectively connected with said hanger, said hangers having holes through which the platen shaft passes and being formed with cams which extend around said shaft, sleeves which embrace said shaft and have tongue and groove connections therewith, means connecting each of said sleeves and an associated hanger whereby movement of the hanger lengthwise of said platen shaft will be accompanied by a like movement of the sleeve, and feeding devices positioned by said sleeves.

35. In an address printing machine, the combination of a rotatable platen, a rotatable shaft to which said platen is secured, sleeves having tongue and groove connections with said shaft and lying adjacent opposite ends of said platen, envelop feeding arms each of which is carried by one of said sleeves, each arm having adjacent its end a finger which extends toward the platen, non-rotatable cams which surround said shaft and act to rock the fingers as said shaft is rotated, means for so connecting said sleeves and cams that any movement of a sleeve lengthwise of the platen shaft is accompanied by a corresponding movement of the associated cam, and a magazine having two independently movable rear corner members each of which is connected with one of said cams whereby a movement of the cam lengthwise of the platen shaft requires a corresponding movement of the magazine member with which it is connected.

36. The combination of a rotatable platen, an envelop magazine which is located above the platen and has a vertical front plate whose lower edge is a short distance above the surface of said platen and is slightly in advance of a vertical plane passing through the axis of said platen, said magazine also having two rear corner members each of which carries an envelop supporting bottom plate located in a plane approximately tangential to the upper point of the platen, a stop finger fixed to the front plate of said magazine extending therefrom toward the platen and to a point in a horizontal plane which is below the top of said platen, feeding mechanism adapted to insert itself between the lower envelop and its flap and to draw said envelop out of the magazine under the front plate thereof and under the stop finger, the lower edge of said stop finger however being in a plane such that if two envelops be simultaneously drawn out of the hopper beneath the front plate thereof the advancing edge of the upper envelop will engage said stop finger.

37. The combination of a rotary shaft, a platen thereon, a pair of arms at opposite ends of the platen, each intermediately carried by said shaft and adapted to rotate with it, envelop feeding fingers at the opposite ends of said arms, and means for moving said fingers toward and from each other during their rotation about the axis of the platen.

38. The combination, with a rotary platen, two pairs of envelope feeding fingers at opposite ends of the platen respectively, single means for moving fingers of one pair toward each other to engage the envelope between its flap and adjacent face and at the same time fingers of the other pair away from each other to clear the envelope, and means for rotating the engaged fingers as a unit with the platen to feed the envelope.

39. The combination of a rotary shaft, a platen thereon, a pair of arms carried by the shaft and longitudinally shiftable thereon, envelope feeding fingers at the ends of said arms, said arms and fingers being adapted to rotate with said shaft, means for moving said fingers toward and from each other during their rotation about the axis of the platen, an envelope magazine having a bottom feed, said magazine being extensible in a direction parallel with said shaft.

40. The combination with bottom feed envelope magazine of adjacent rotary platen, a pair of envelope feeding fingers at opposite ends of said platen, mechanism for continuously rotating the platen and continuously rotating the fingers about the same axis, stationary cams for causing said fingers to approach each other and recede from each other during the said rotation, whereby they may engage the envelope between its flap and adjacent face and then draw said envelope along with them in a curved path and thereafter clear the envelope, and means for guiding the envelope after the feeding fingers have cleared it.

41. The combination of a rotatable platen shaft, a platen fixed thereto, an envelope magazine adjacent said platen, two feed arms which are respectively located at opposite ends of said platen and are pivoted to said shaft on axes which are at substantial right angles to said shaft,—each of said arms having at its end an offset feed finger, —and means for rocking said feed arms on their pivots as the shaft rotates substantially as and for the purpose specified.

42. The combination of a rotatable platen shaft, a platen fixed thereto, an envelop magazine adjacent said platen, two feed arms each of which near its middle is pivoted to said shaft on an axis substantially at right angles to the shaft and each of said levers having at its ends an offset feed finger, and means for rocking said feed levers on their pivots as the shaft rotates substantially as and for the purpose specified.

43. The combination of a rotatable platen shaft, a platen fixed thereto, an envelop magazine adjacent said platen, two feed arms which are respectively located at opposite ends of said platen and are pivoted to said shaft on axes which are at substantial right angles to said shaft, each of said arms having at its ends an offset feed finger, a fixed cam which is associated with and engages each feed arm and causes it to rock on its pivot, substantially as specified, as said shaft rotates.

44. The combination of a feed magazine, comprising a fixed front plate and two rear corner members, a sliding frame on which said corner members are mounted which frame is movable toward and from the fixed plate and said corner members being movable on said frame toward and from each other and each of said corner members having at its lower end an envelop supporting bottom, a rotatable platen located below said magazine, a shaft to which said platen is secured, feed arms located at opposite ends of said platen and respectively pivoted to said shaft on axes which are substantially at right angles to the shaft each of said arms having at its end an offset feed finger, two cams which loosely embrace the said shaft adjacent said feed arms, means which prevent the rotation of said cams but permit their longitudinal movement upon said shaft, means to preserve the engagement of said cam respectively with the adjacent feed arms, and connections between said cams respectively and the two corner members of the magazine to require that when the cams are moved longitudinally with respect to the shaft the magazine corner member shall be similarly moved.

45. The combination of a feed magazine, comprising a fixed front plate and two rear corner members, a sliding frame on which said corner members are mounted which frame is movable toward and from the fixed plate and said corner members being movable on said frame toward and from each other and each of said corner plates having at its lower end an envelop supporting bottom, a rotatable platen located below said magazine, a shaft to which said platen is secured, feed arms located at opposite ends of said platen and respectively pivoted to said shaft on axes which are substantially at right angles to the shaft,—each of said arms having at its end an offset feed finger, two cams which loosely embrace the said shaft adjacent said feed arms, means which prevent the rotation of said cams but permit their longitudinal movement upon said shaft, means to preserve the engagement of said cams respectively with the adjacent feed arms, and toggles which connect the two magazine corner members with the two cams respectively.

46. In an address printing machine, the combination of an envelop magazine whose bottom does not extend beneath the flaps of the envelops supported thereon, an adjacently placed rotatable platen, a rotatable shaft to which said platen is secured, sleeves having tongue and groove connections with said shaft and lying adjacent opposite ends of said platen, envelop feeding arms each of which is pivoted to one of said sleeves on an axis which is transverse with respect to said sleeve,—each of said arms having at each of its ends a finger which extends toward the platen, and nonrotatable cams which surround said shaft and engage said pivoted arms and rock them on their pivots.

47. In an address printing machine, the combination of an envelop magazine whose bottom does not extend beneath the flaps of the envelop supported thereon, an adjacently placed rotatable platen, a rotatable shaft to which said platen is secured, sleeves having tongue and groove connections with said shaft and lying adjacent opposite ends of said platen, envelop feeding arms each of which extends on opposite sides of said shaft and is pivoted to one of said sleeves on an axis which is diametrical with respect to said shaft each of said arms having at each of its ends an offset finger, non-rotatable cams which surround said shaft and engage said pivoted arms and rock them on their pivots, and means for so connecting said sleeves and cams that any movement of a sleeve lengthwise of the shaft is accompanied by a corresponding movement of the associated cam.

48. In an address printing machine, the combination of a rotatable platen, a rotatable shaft to which said platen is secured, a transversely extended horizontal frame member, a pair of hangers slidably mounted upon said frame member adjacent opposite ends of said platen, two envelop magazine members respectively connected with said hanger, said hangers having holes through which the platen shaft passes and being formed with cams which extend around said shaft, sleeves which embrace said shaft and have tongue and groove connections therewith, means connecting each of said sleeves and an associated hanger whereby any movement of the hanger lengthwise of said platen shaft will be accompanied by a like movement of the sleeve, and feed arms pivoted respectively to said sleeves on axes which are transverse to said sleeves each of said arms being adapted to be engaged by the adjacently placed cam, and each arm having at both of its ends an offset feed finger which extends toward the platen and is adapted in certain positions of the arm to which it is fixed to pass between the flap and body of the lowermost envelop in said magazine.

49. In an address printing machine, the combination of a rotatable platen, a rotatable shaft to which said platen is secured, sleeves having tongue and groove connections with said shaft and lying adjacent opposite ends of said platen, envelop feeding arms each of which is pivoted to one of said sleeves on an axis which is diametrical with respect to said shaft each arm having adjacent its end a finger which extends toward the platen, non-rotatable cams which surround said shaft and engage said pivoted arms and rock them on their pivots as said shaft is rotated, means for so connecting said sleeves and cams that any movement of a sleeve lengthwise of the platen shaft is accompanied by a corresponding movement of the associated cam, and a magazine having two independently movable rear corner members each of which is connected with one of said cams whereby a movement of the cam lengthwise of the platen shaft requires a corresponding movement of the magazine member with which it is connected.

50. The combination of a rotatable platen shaft, a cylindrical platen fixed thereon, an envelop magazine which is located above the platen and has a vertical front plate whose lower edge is a short distance above the surface of said platen and is slightly in advance of a vertical plane passing through the axis of said platen, said magazine also having two rear corner members each of which carries an envelop supporting bottom plate located in a plane approximately tangential to the upper point of the platen, a stop finger fixed to the front plate of said magazine and extending therefrom toward the platen and to a point in a horizontal plane which is below the top of said platen, feed arms carried by said shaft each having an offset feed finger adapted to insert itself between the lower envelop and its flap and to draw said envelop out of the magazine under the front plate thereof and under the stop finger, the lower edge of said stop finger however being in a plane such that if two envelops be simultaneously drawn out of the magazine beneath the front plate thereof the advancing edge of the upper envelop will engage said stop finger.

51. The combination with an extensible envelop magazine, of a rotary platen, an adjustable envelope feeding device, and means coupled with the magazine and the feeding device for insuring corresponding adjustment of one when the other is adjusted.

52. The combination with an extensible envelop magazine, of a rotary platen and feeding mechanism comprising a pair of envelop feeding devices at opposite ends of the platen, each device being adjustable toward and from the platen, and means coupled with the magazine and the feeding mechanism for insuring a corresponding adjustment of one with reference to the other.

53. The combination with an extensible envelop magazine and a rotary platen, a rotary shaft on which the same is mounted, a pair of envelop feeding devices mounted on the shaft to rotate therewith, said devices being adjustable longitudinally of the shaft, and means coupling the magazine with said devices for insuring correspondence in their adjustment.

54. In an article feeding machine, a support for articles, means whereby a portion of the endmost article projects beyond the support, and means comprising two members movable towards each other and movable toward the ends of the article to engage the latter and move it from its support.

55. In an envelope feeding machine, a support for a plurality of envelopes, said support having an open end whereby the flap of the endmost envelope will project away from the envelope body, and means including two members movable towards each other and movable in more than one plane to engage the flap and withdraw the envelope from the stack.

56. In an envelope feeding machine, means for supporting a substantially upright stack of envelopes while leaving the flap of the bottom-most envelope free to depend, and means including two members movable towards each other and movable toward the ends of the envelope to engage the flap of such bottom-most envelope and withdraw it from the stack.

57. In an envelope feeding machine, a support for a stack of envelopes, a rotary feeding drum, feeding fingers coacting therewith, and means to move said fingers towards each other to first engage the back of the bottom-most envelope in said stack and then to move into conveying position at the juncture of the flap and body of the envelope.

58. In an envelope feeding machine, a support for a stack of envelopes, said support having an open bottom whereby the flap on the bottom-most envelope may project away from the envelope body, and envelope moving means including members movable towards each other for first engaging the body of the envelope and then moving against the flap hinge.

59. In an envelope feeding machine, the combination with means for supporting a stack of envelopes, rotary envelope carrying means, a pair of fingers movable towards each other for engaging the envelope, and additional means to cause said fingers to first engage the body of the envelope on the back thereof and then to move into engagement with the envelope at the flap hinge.

60. In a machine for feeding envelopes, the combination of a support for a stack of envelopes, rotary means to advance an envelope, means including members movable towards each other for engaging the body of the envelope on the back thereof, said last mentioned means being movable relative to the envelope to engage the flap after which it removes the envelope from said stack.

61. In an envelope feeding machine, the combination with means for supporting a stack of envelopes, means to advance an envelope, means to engage an envelope, and additional means including two members movable towards each other to cause said engaging means to be first positioned against the body of the envelope on the back portion thereof and then to move into engagement with the flap.

62. The combination with an envelope feeding machine, a support for a stack of envelopes, means to advance an envelope, a pair of fingers movable toward each other for coacting with said advancing means for engaging the envelope, and additional means to cause said fingers to first engage the body of the envelope on the back portion thereof and then to move into engagement with the flap.

Signed at Cleveland, Ohio, this 31st day of January, 1920.

CLIFTON CHISHOLM.